United States Patent
Geringer et al.

[11] Patent Number: 5,831,221
[45] Date of Patent: *Nov. 3, 1998

[54] CASTER MOUNTED WEIGHING SYSTEM

[75] Inventors: E. Randy Geringer, Westport; Joseph Goldberg, Easton, both of Conn.

[73] Assignee: Future Sysems, Inc., Westport, Conn.

[ * ] Notice: The term of this patent shall not extend beyond the expiration date of Pat. No. 5,823,278.

[21] Appl. No.: 322,787

[22] Filed: Oct. 13, 1994

[51] Int. Cl.⁶ .................................................. G01G 19/52
[52] U.S. Cl. ............................................................ 177/144
[58] Field of Search .................................. 177/136, 144, 177/199, 200, 126, 229, 211, 45, 244, 245

[56] References Cited

U.S. PATENT DOCUMENTS

| | | | |
|---|---|---|---|
| 2,458,481 | 1/1949 | Ruge ........................................ | 177/211 |
| 3,338,323 | 8/1967 | Swersey ................................... | 177/244 |
| 3,722,611 | 3/1973 | Tirkkonen . | |
| 3,961,675 | 6/1976 | Siegel . | |
| 4,015,677 | 4/1977 | Silva et al. . | |
| 4,033,420 | 7/1977 | De Masters . | |
| 4,038,973 | 8/1977 | Moore . | |
| 4,065,962 | 1/1978 | Shoberg . | |
| 4,162,628 | 7/1979 | Oetjen et al. ............................ | 177/211 |
| 4,242,672 | 12/1980 | Gault . | |
| 4,281,730 | 8/1981 | Swersey et al. . | |
| 4,312,241 | 1/1982 | Budraitis . | |
| 4,363,368 | 12/1982 | Paddon et al. . | |
| 4,420,052 | 12/1983 | Hale . | |
| 4,453,422 | 6/1984 | Yorgiadis .............................. | 73/862.66 |
| 4,453,608 | 6/1984 | Wirth et al. . | |
| 4,459,863 | 7/1984 | Nordstrom . | |
| 4,600,066 | 7/1986 | Griffen et al. . | |
| 4,615,511 | 10/1986 | Gindy et al. . | |
| 4,657,097 | 4/1987 | Griffen . | |
| 4,666,003 | 5/1987 | Reichow . | |
| 4,669,136 | 6/1987 | Waters et al. . | |
| 4,793,428 | 12/1988 | Swersey . | |
| 4,799,562 | 1/1989 | Burrows . | |
| 4,801,152 | 1/1989 | Elliott et al. .......................... | 280/47.34 |
| 4,813,504 | 3/1989 | Kroll . | |
| 4,878,551 | 11/1989 | Watkins et al. . | |

(List continued on next page.)

FOREIGN PATENT DOCUMENTS

WO 81/01196
A1    4/1981    United Kingdom .

OTHER PUBLICATIONS

Hill–ROM Advance 2000 Model Bed Broshure, including excerpts from instructions for use of Advance 2000 Bed. Author unknown. Time and place of publication unknown.

*Primary Examiner*—Michael L. Gellner
*Assistant Examiner*—Randy W. Gibson
*Attorney, Agent, or Firm*—Seyfarth, Shaw, Fairweather & Geraldson

[57] ABSTRACT

A caster mounted weighing system comprised of at least three caster assemblies mounted to the bottom of a bed, container, or other surface suitable for weighing, a control unit, a junction box, and a means for transmitting signals to and from the caster assemblies, junction box, and control unit. The caster assembly may be comprised of a caster, which rests on the floor, a load cell attached to the caster, strain gauges or other means for measuring the load applied to the load cell, and a stem or other attachment means which permits the caster assembly to be mounted to the bottom of a bed frame, container, or other surface suitable for weighing. In alternate embodiments, each caster assembly may be comprised of a plurality of casters centered below a caster plate, or the caster assemblies may be secured to the bed or container by a collar or clamp, rather than by a stem.

In an alternate embodiment, the system is comprised of support assemblies, rather than caster assemblies, mounted to the bottom of a bed, container, or other surface suitable for weighing, a control unit, a junction box, and a means for transmitting signals to and from the support assemblies, junction box, and control unit.

49 Claims, 2 Drawing Sheets

U.S. PATENT DOCUMENTS

| | | |
|---|---|---|
| 4,899,840 | 2/1990 | Boubille . |
| 4,905,780 | 3/1990 | Goff, III . |
| 4,926,951 | 5/1990 | Carruth et al. . |
| 4,934,468 | 6/1990 | Koerber, Sr. et al. . |
| 4,953,244 | 9/1990 | Koerber, Sr. et al. . |
| 4,961,470 | 10/1990 | Koerber, Sr. . |
| 4,974,692 | 12/1990 | Carruth et al. . |
| 5,083,624 | 1/1992 | Reichow . |
| 5,086,856 | 2/1992 | Haggstrom . |
| 5,099,702 | 3/1992 | French . |
| 5,172,781 | 12/1992 | Hlavinka et al. . |
| 5,173,977 | 12/1992 | Carruth et al. . |
| 5,190,116 | 3/1993 | Reichow . |
| 5,237,501 | 8/1993 | Gusakov . |
| 5,269,388 | 12/1993 | Reichow et al. . |
| 5,276,432 | 1/1994 | Travis . |
| 5,279,010 | 1/1994 | Ferand et al. . |
| 5,293,007 | 3/1994 | Darst et al. . |
| 5,319,817 | 6/1994 | Hay et al. . |
| 5,336,854 | 8/1994 | Johnson . |
| 5,511,571 | 4/1996 | Adrezin et al. ............... 73/379.08 |

CASTER MOUNTED WEIGHING SYSTEM

The caster mounted weighing system of the present invention may be used in a variety of applications involving the weighing of people or objects in various settings. For example, the present invention may be used in an in-bed patient weighing system, for weighing bulk materials on rolling carriers, or for any other application in which a person or object must be weighed while it is in a container or on a surface, such as shelving.

BACKGROUND OF THE INVENTION

It is frequently desirable to accurately monitor the weight of a patient confined to a bed, whether in a hospital, at home, or in other treatment settings, and to observe changes in weight to monitor the health of the patient and ensure that proper dosages of medication are administered. It is difficult, however, to weigh seriously ill patients or patients with limited mobility by removing the patient from the bed on a regular basis. Critically ill patients, in particular, may require frequent weighing, with their severe physical condition preventing their removal from bed.

Beds incorporating weighing systems, such that the patient need not be removed from the bed to be weighed, have been disclosed, for example, in Reichow et al., U.S. Pat. No. 5,269,388, and Carruth et al., U.S. Pat. No. 4,926,951. The system disclosed in Reichow et al. utilizes load cells which are rigidly mounted along the sides of the bed frame. The Carruth system utilizes a separate weigh frame mounted to the bed frame. These systems are generally an integral part of the bed, and must be incorporated into the bed when it is manufactured. Beds incorporating these weighing systems are generally more expensive than ordinary beds without a weighing system, and are also heavier, making it more difficult to move such beds.

The caster mounted weighing system may also be used to address a number of other types of weighing applications, in addition to bed weighing systems. In many applications, it would be desirable to retrofit a device which was not originally designed to be a scale with a weighing system. For example, in some circumstances, it may be desirable to determine the weight of bulk material stored in a large container (e.g. storage tub) without removing the material from the container or placing the container on a scale. Accurately weighing the material may be difficult, if not impossible, unless the material is contained within the container. Yet, a container filled with bulk material is generally heavy and difficult to move; moving the container onto a scale may be difficult and time-consuming. It might also be desirable to determine the weight of materials stored on fixed shelving or storage racks, without removing the material from the shelf or storage area. Thus, it would be desirable to retrofit a container or weight bearing surface with a weighing device so that materials may be weighed without removal from the container or surface.

It is, therefore, an object of this invention to provide a relatively inexpensive, accurate weighing system which may be installed on a bed.

It is also an object of this invention to provide a relatively inexpensive, accurate weighing system which may be installed on a container, shelving unit, or other surface suitable for weighing.

It is a further object of this invention to provide a weighing system which may be retrofit to an existing bed, container, or other surface suitable for weighing, and need not be installed at the time of original manufacture.

SUMMARY OF THE INVENTION

These objects and others are achieved by the caster mounted weighing system of the present invention, which is comprised of at least three caster assemblies mounted to the bottom of a bed, container, or other surface suitable for weighing, a control/display unit, a junction box, and a means for transmitting signals to and from the caster assemblies, junction box, and control unit. The caster assembly may be comprised of a caster, which rests on the floor, a caster plate or other attachment means mounted to the top of the caster, a load cell mounted to the top of the attachment means, strain gauges or other means for measuring the load applied to the load cell, and a stem or other attachment means which permits the caster assembly to be mounted to the bottom of a bed frame, container, or other surface suitable for weighing. In an alternate embodiment, the caster assembly may be comprised of a stem caster, which rests on the floor, a load cell which is mounted at one end to be stem of the caster and has a stem at the other end which permits the caster assembly to be mounted to the bottom of a bed frame, container, or other surface suitable for weighing, and strain gauges or other means for measuring the load applied to the load cell. To accurately weigh a patient in a hospital bed, or the contents of a container or weight bearing surface, the load applied to each of the caster assemblies is measured at the caster assembly and transmitted to the junction box. The values from each of the corners of the bed or container are then summed at the junction box and the weight of the patient, or contents of the container, is displayed on the control/display unit.

In alternate embodiments, other forms of casters, rolling balls, and distributed rolling elements may be used, or the caster assemblies may be secured to the bed or container by a collar, clamp, or other attachment means, rather than by a stem.

In an alternate embodiment, the system is comprised of support assemblies, rather than caster assemblies, mounted to the bottom of a bed, container, or other surface suitable for weighing, a control/display unit, a junction box, and a means for transmitting signals to and from the support assemblies, junction box, and control unit.

This system may be installed during manufacture of the bed frame or weight bearing device, or it may be installed on existing beds or devices by removing the existing casters or supports from the bed or device and replacing them with the caster assemblies or support assemblies of the present invention. The system is relatively inexpensive to implement, because only the casters or supports of the bed or container must be replaced. And it is accurate to the accuracy level of the strain gauges and junction box circuitry; in typical applications, this is 0.1% of the full scale reading.

Further objects, features, and advantages of the invention will become evident from a consideration of the following detailed description when taken in conjunction with the accompanying drawings and the appended claims.

BRIEF DESCRIPTION OF THE DRAWINGS

For the purpose of facilitating an understanding of the invention there are illustrated in the accompanying drawings preferred embodiments thereof, from an inspection of which, when considered in connection with the following description, the construction and operation of the invention, and many of its advantages, should be readily understood and appreciated.

DETAILED DESCRIPTION OF THE PREFERRED EMBODIMENT

Figure 1:
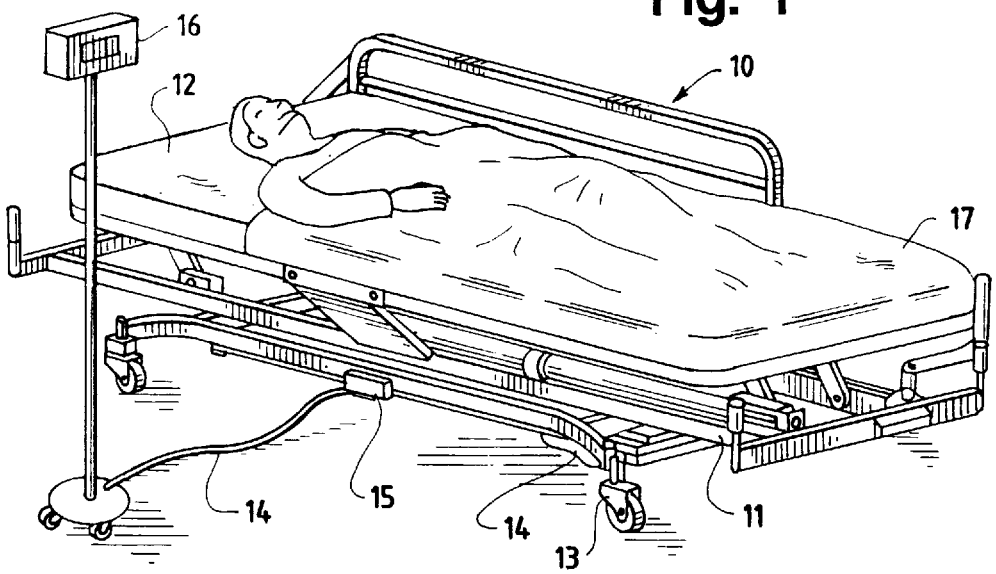
FIG. 1 is an elevational view of a bed including the in-bed weighing system.

The caster mounted weighing system as used in an in-bed weighing system is shown in FIG. 1. The system is comprised of caster assemblies 13 mounted to each of the four corners of the bed frame 11 of a bed 10, a junction box 15, a control/display unit 16, and means 14 for transmitting signals to and from the control unit 16, the junction box 15, and the caster assemblies 13.

Figure 2:
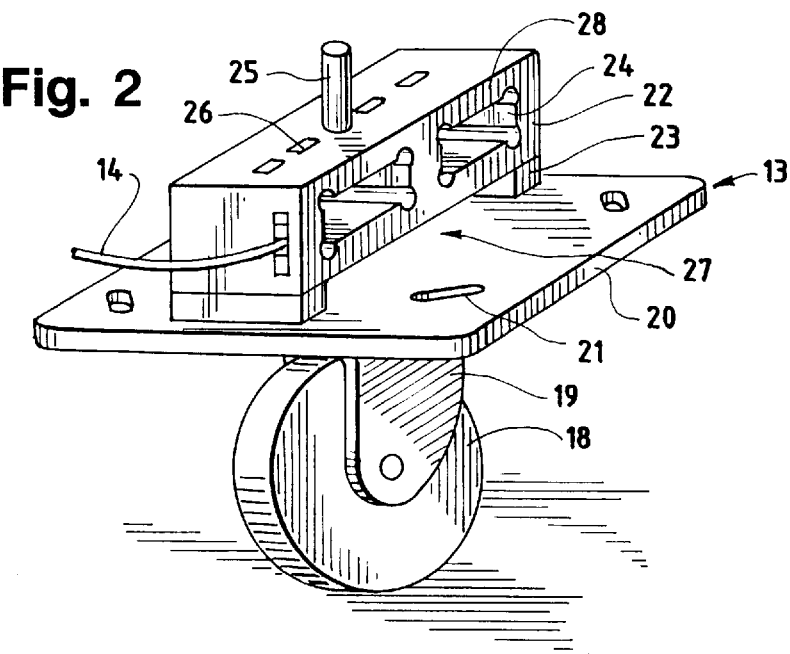
FIG. 2 is a perspective view of one embodiment of the caster assembly of the in-bed weighing system.
Figure 3:
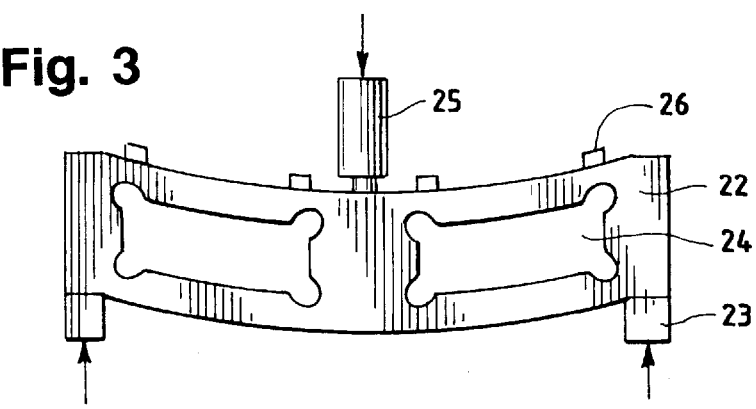
FIG. 3 is a side view of the caster assembly, shown in FIG. 2, in a deformed state, illustrating its response when a load to be measured is applied to the caster assembly.

One embodiment of a caster assembly 13 is illustrated in FIGS. 2 and 3. The caster assembly 13 includes a caster 18 mounted to a caster top plate 20 by a mounting bracket 19. The caster 18 may be any type of rolling device. Holes 21 in the top plate 20 may be used to attach a cover or shroud for cosmetic purposes. The mounting bracket 19 may be attached to the top plate 20 by inserting a stem portion of the mounting bracket 19 into the top plate 20 or by a commercially available circular bearing. A load cell 22, which may be connected to a bed frame 11 by means of a stem 25, is mounted on top of the top plate 20. In the embodiment shown in FIG. 2, a load cell 22 is comprised of a deformable section 28 having supports 23 at either end of the section 28 such that the central portion of the load cell 22 is spaced from the top plate 20. Flanged holes 24 may be provided in the deformable component of the load cell 22 to accentuate the strain when a load is applied to the load cell 22. Strain gauges 26, which may be mounted on the top or bottom of the deformable component of the load cell 22, measure the load applied to the load cell 22, and transmit this measurement to the control unit 16 by the signal transmitting means 14. A deflection stop 27 may be provided to limit the deformation of the deformable component of the load cell 22. FIG. 3 illustrates the caster assembly of FIG. 2 when a load is applied.

The system illustrated in FIGS. 1, 2, and 3 operates as follows. When the caster assemblies 13 are mounted to the corners of the bed 10, the weight of the bed 10 is applied to the stems 25 of the caster assemblies. Applying this load to the stem 25 of the caster assembly 13 causes the deformable section 28 of the load cell 22 to deform, as shown in FIG. 3. The extent to which the load cell 22 will deform may be enhanced by providing holes 24 in the load cell, and it may be limited by providing a deformation stop 27. Strain gauges 26 mounted on top of the deformable component of the load cell 22 measure the load applied to the caster assembly 13 by measuring the deformation of the load cell 22.

Before a patient is placed in the bed 10, the tare weight of the bed 10 is determined. The tare weight of the bed 10 should include the weight of the bed frame 11 and mattress 12, and the weight of the specific items which will be placed on the bed with the patient, such as sheets 17, a pillow, or other items. Once the tare weight is initially determined it need not be re-determined unless different items 17 are to be placed on the bed with the patient.

Figure 8:
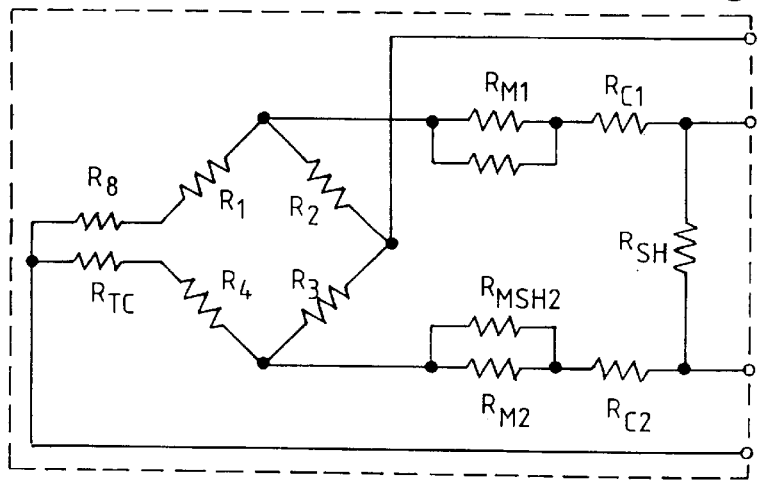
FIG. 8 is a schematic diagram of one embodiment of the control unit for the in-bed patient weighing system.

After the tare weight of the bed 10 is determined, the patient may be placed in the bed 10. The patient may then be weighed on a regular basis, such as daily, by turning on the control/display unit 16. When the control/display unit 16 is activated, a signal is sent from each load cell assembly 22, and the load applied to each caster assembly 13 is measured. The measurements obtained at each load cell assembly 22 is transmitted to the junction box 15, where the measurements are summed. Within the junction box 15 a wheatstone bridge 30, as shown in FIG. 8, or other means, may be used to sum the measurements from the caster assemblies 13. The total weight of the patient is then transmitted to the control/display unit 16 from the junction box 15.

Figure 4:
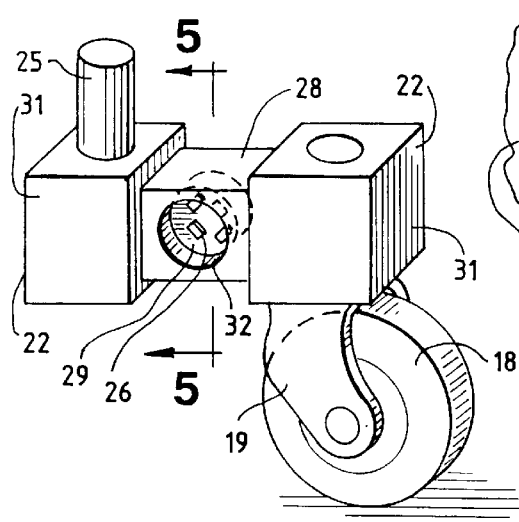
FIG. 4 is a perspective view of an alternate embodiment of the caster assembly of the in-bed weighing system.
Figure 5:
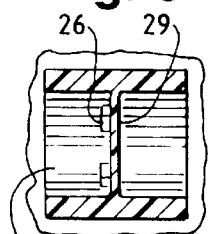
FIG. 5 is an enlarged cross-sectional view of the load cell portion of the caster assembly shown in FIG. 4.
Figure 6:
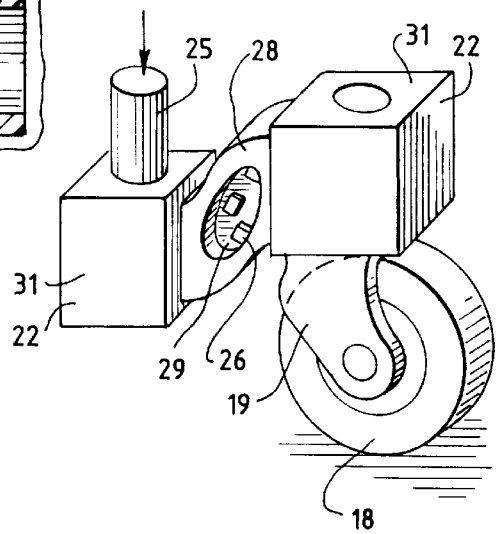
FIG. 6 is a perspective view of the embodiment of the caster assembly, shown in FIG. 4, in a deformed state, illustrating its response when a load to be measured is applied to the caster assembly.

An alternate embodiment of the caster assembly 13 is shown in FIG. 4. In that embodiment, a caster 18 is mounted to one end of a load cell 22 by a mounting bracket 19. The mounting bracket 19 may be attached to the load cell 22 by inserting a stem portion of the mounting bracket 19 into the load cell 22. The load cell 22 is comprised of two rigid end sections 31 and a central deformable section 28 which extends from one rigid end section 31 to the other. The caster 18 is mounted to one of the rigid end sections 31, and a stem 25, which may be used to attach the caster assembly 13 to a bed frame or other container, extends upward from the other rigid end section 31. As shown in FIGS. 4 and 5, holes 32 may be bored into the deformable section 28 from either side, leaving a thin membrane 29 between the holes 32. In a preferred embodiment, the thickness of the membrane is relative to the size of the load to be applied such that deformation in response to the load applied is pronounced. Mounted on the membrane 29 are strain gauges 26 or other means for determining the load applied to the caster assembly. FIG. 6 shows the caster assembly of FIGS. 4 and 5 when a load is applied to the caster assembly.

Figure 7:
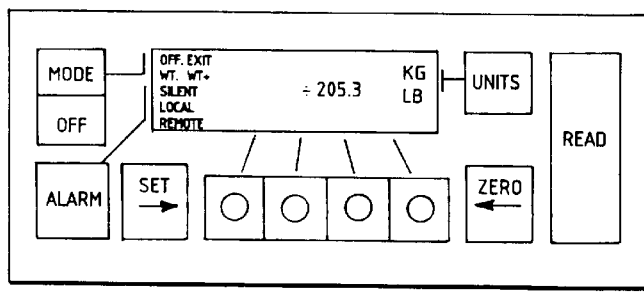
FIG. 7 is a front view of one embodiment of the control panel of the in-bed weighing system.

In the in-bed patient weighing system described, the control/display unit 16 illustrated in FIGS. 1 and 7 may be stationary, as shown, or a hand held unit may be used. If a hand held unit is used, one control/display unit 16 may be used to obtain weight measurements from several beds; the unit 16 may be connected to each caster mounted weighing system when a measurement is desired, and disconnected after the measurement is obtained. The in-bed patient weighing system described may also incorporate an alarm feature, as noted in FIG. 7, such that an alarm is triggered if a pre-set change in the weight applied to the bed occurs (as when the patient gets out of the bed).

In addition to the embodiments shown and described here, modifications to some features of the caster assembly may be made within the scope of the invention. For instance, other forms of casters, rolling balls, and distributed rolling elements can be used in other embodiments. These arrangements may tend to distribute the applied loads centrally and reduce or eliminate any offset or eccentric loadings. The caster assemblies may also be secured to the bed or container by a collar, clamp, or other attachment means, rather than by a stem.

While the system has been described and illustrated using casters, bed supports that do not facilitate movement of the bed may be used. Thus, support assemblies comprising a support, such as a leg or foot with no wheel attached thereto, and a load cell may be used. Similarly, the support assemblies or caster assemblies described may be attached to other types of weight bearing devices, such as containers or shelves. If caster assemblies are used, the weight bearing device or bed may be moved from one location to another without affecting the accuracy of the weighing system, provided that a brief stationary period is allowed before using the weighing system.

The system described may also be used in a variety of applications. For example, a device having the primary purpose of serving as a shelving unit may be retrofit with the caster assemblies or the support assemblies of the present invention. By retrofitting the shelving unit with the present invention, the storage shelves may act as scales, and inventory may be easily monitored. In addition, the unit may be equipped with an alarm which may be activated when an item is removed from the shelf.

The invention has been described above in an illustrative manner and it is to be understood that terminology which has been used is intended to be in the nature of description rather than of limitation. Obviously, many modifications and variations of the present invention are possible in light of the above teachings. It is therefore to be understood that within the scope of the appended claims, the invention may be practiced otherwise than as specifically described.

What is claimed is:

1. A weighing device comprising:
    a weight bearing surface,
    at least three independent caster assemblies independently removably attached to said weight bearing surface for supporting said weight bearing surface, wherein each caster assembly includes a caster and a measuring structure carried by the caster independently of other caster assemblies for measuring the weight applied to the caster assembly,
    accumulating means for accumulating and processing the weight information collected from each measuring structure, and
    transmitting means for transmitting signals between the measuring structures on said caster assemblies and the accumulating means.

2. A device according to claim 1, wherein the accumulating means comprises a junction box and a control unit.

3. A device according to claim 1, wherein the measuring structure comprises a load cell device.

4. A device according to claim 3, wherein each caster assembly includes a stem attached to the top of the load cell device.

5. A device according to claim 4, wherein the load cell device comprises a deformable portion having at least one flanged hole therein and a load cell support at the perimeter of the deformable portion, and a measuring element mounted on the deformable portion of the load cell device.

6. A device according to claim 5, wherein the measuring element is a strain gauge.

7. A device according to claim 4, wherein the load cell device comprises a first load cell support attached to the caster, a deformable section having a cylindrical hole therein attached to the first load cell support, a second load cell support attached to the deformable section and to the stem, and a measuring element mounted within the cylindrical hole in the deformable section.

8. A device according to claim 7, wherein the measuring element is a strain gauge.

9. A device according to claim 1, further comprising a display means.

10. A device according to claim 9, wherein the display means is portable.

11. An apparatus for weighing a person in a bed, that includes a bed frame, comprising:
    at least three independent support assemblies independently removably connected to the bottom of the bed frame for supporting the bed frame, each of said support assemblies including a bed support and a measuring structure carried by the bed support independently of other support assemblies for measuring the weight supported by the bed support,
    accumulating means for accumulating and processing the weight information collected from each measuring structure, and
    transmitting means for transmitting signals between the measuring structures and the accumulating means.

12. An apparatus according to claim 11, wherein said measuring structure comprises a load cell device.

13. An apparatus according to claim 12, wherein each support assembly includes a stem attached to the top of the load cell device.

14. An apparatus according to claim 13, wherein the load cell device comprises a deformable portion having at least one flanged hole therein and a load cell support at the perimeter of the deformable portion, and a measuring element mounted on the deformable portion of the load cell device.

15. An apparatus according to claim 14, wherein the measuring element is a strain gauge.

16. An apparatus according to claim 13, wherein the load cell device comprises a first load cell support attached to the bed support, a deformable section having a cylindrical hole therein attached to the first load cell support, a second load cell support attached to the deformable section and to the stem, and a measuring element mounted within the cylindrical hole in the deformable section.

17. An apparatus according to claim 11, wherein the measuring structure includes a strain gauge.

18. An apparatus according to claim 11, further comprising an alarm.

19. An apparatus according to claim 11, wherein said apparatus is removable from said bed.

20. An apparatus according to claim 11, further comprising a display means.

21. An apparatus according to claim 20, wherein the display means is portable.

22. An apparatus for weighing a person in a bed, that includes a bed frame, comprising:
    at least three independent caster assemblies independently removably connected to the bottom of the bed frame for supporting the bed frame, each of said caster assemblies including a caster and a measuring structure carried by the caster independently of the other caster assemblies for measuring the weight applied to the caster,
    accumulating means for accumulating and processing the weight information collected from each measuring structure, and
    transmitting means for transmitting signals between the measuring structures and the accumulating means.

23. An apparatus according to claim 22, wherein the measuring structure comprises a load cell device.

24. An apparatus according to claim 23, wherein each caster assembly comprises a caster, a load cell device attached to the caster, includes a stem attached to the top of the load cell device.

25. An apparatus according to claim 24, wherein the load cell device comprises a deformable portion having at least one flanged hole therein and a load cell support at the perimeter of the deformable portion, and a measuring element mounted on the deformable portion of the load cell device.

26. An apparatus according to claim 25, wherein the measuring element is a strain gauge.

27. An apparatus according to claim 24, wherein the load cell device comprises a first load cell support attached to the caster, a deformable section having a cylindrical hole therein attached to the first load cell support, a second load cell support attached to the deformable section and to the stem, and a measuring element mounted within the cylindrical hole in the deformable section.

28. An apparatus according to claim 27, wherein the measuring element is a strain gauge.

29. An apparatus according to claim 22, further comprising an alarm.

30. An apparatus according to claim 22, wherein said apparatus is removable from said bed.

31. An apparatus according to claim 22, further comprising a display means.

32. An apparatus according to claim 31, wherein the display means is portable.

33. A weighing device that may be retrofitted on a weight bearing device, where the intended use at the time of manufacture of the weight bearing device was not to function as a scale, said weighing device comprising:

at least three independent support assemblies adapted to be independently removably retrofitted to the weight bearing device for support thereof, wherein each support assembly includes a support and measuring structure carried by the support independently of other support assemblies for measuring the weight applied to the support assembly, accumulating means for accumulating and processing the weight information collected from each measuring structure, and transmitting means for transmitting signals between the measuring structures on said support assemblies and the accumulating means.

34. A device according to claim 33, wherein the accumulating means comprises a junction box and a control unit.

35. A device according to claim 33, wherein the measuring structure comprises a load cell device.

36. A device according to claim 35, wherein each support assembly includes a stem attached to the top of the load cell device.

37. A device according to claim 36, wherein the load cell device comprises a deformable portion having at least one flanged hole therein and a load cell support at the perimeter of the deformable portion, and a measuring element mounted on the deformable portion of the load cell device.

38. A device according to claim 37, wherein the measuring element is a strain gauge.

39. A device according to claim 36, wherein the load cell device comprises a first load cell support attached to the support, a deformable section having a cylindrical hole therein attached to the first load cell support, a second load cell support attached to the deformable section and to the stem, and a measuring element mounted within the cylindrical hole in the deformable section.

40. A device according to claim 39, wherein the measuring element is a strain gauge.

41. A device according to claim 33, further comprising an alarm.

42. A device according to claim 33, wherein said weighing device is removable from said weight bearing device.

43. A device according to claim 33, further comprising a display means.

44. A device according to claim 43, wherein the display means is portable.

45. A weight measuring caster assembly comprising:

a bracket, a caster rotatably mounted on said bracket, and only a single weight measuring structure carried by said bracket for measuring weight applied to the caster assembly; and coupling structure carried by said bracket for removable and rigid attachment to a weight bearing structure.

46. The caster assembly according to claim 45, wherein the measuring structure includes a load cell device.

47. The caster assembly according to claim 45, wherein the measuring structure includes a load cell device attached to the bracket and a stem attached to the top of the load cell device.

48. The caster assembly according to claim 47, wherein the load cell device includes a deformable portion having at least one flanged hole therein and a load cell support at the perimeter of the deformable portion, and a measuring element mounted on the deformable portion of the load cell device.

49. The caster assembly according to claim 48, wherein the measuring element is a strain gauge.

* * * * *